United States Patent
Baek

(10) Patent No.: US 8,495,116 B2
(45) Date of Patent: Jul. 23, 2013

(54) CIRCUIT AND METHOD CONVERTING BOOLEAN AND ARITHMETIC MASKS

(75) Inventor: Yoo-jin Baek, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 734 days.

(21) Appl. No.: 12/717,249

(22) Filed: Mar. 4, 2010

(65) Prior Publication Data

US 2010/0235417 A1 Sep. 16, 2010

(30) Foreign Application Priority Data

Mar. 13, 2009 (KR) .................. 10-2009-0021866

(51) Int. Cl.
*G06F 7/00* (2006.01)
*G06F 15/00* (2006.01)

(52) U.S. Cl.
USPC ........... 708/200; 708/201; 708/203; 708/205; 708/209

(58) Field of Classification Search
None
See application file for complete search history.

(56) References Cited

U.S. PATENT DOCUMENTS 7,334,133 B2 2/2008 Goubin
2005/0086452 A1* 4/2005 Ross ............................ 712/34

FOREIGN PATENT DOCUMENTS

JP 2008042328 A 2/2008
KR 1020050072537 A 7/2005

* cited by examiner

*Primary Examiner* — Scott Sun
(74) *Attorney, Agent, or Firm* — Volentine & Whitt, PLLC

(57) ABSTRACT

A circuit for converting Boolean and arithmetic masks includes "m" converting units, wherein m is an integer greater than 1. Each of the m converting unit includes; a first converting unit configured to receive first bits of input data, output one of the first bits as a first output bit, perform an XOR operation with respect to at least part of the first bits, and output an XOR operation result as a first intermediate result bit to a next converting unit in a sequence of converting unit ranging between 2 and $n-1^{th}$; and an $n^{th}$ converting unit, wherein n is an integer greater than or equal to 2 and less than or equal to m, configured to receive $n-1^{th}$ bits and $n^{th}$ bits of the input data, and at least one of an $n-1^{th}$ intermediate result bit and $n-1^{th}$ output bit from an $n-1^{th}$ converting unit, perform an AND operation and the XOR operation with respect to a first group of the received bits, output an operation result for the first group as an $n^{th}$ output bit, perform the AND operation and the XOR operation with respect to a second group of the received bits, and output an operation result of the second group as an $n^{th}$ intermediate result bit.

10 Claims, 6 Drawing Sheets

US 8,495,116 B2

CIRCUIT AND METHOD CONVERTING BOOLEAN AND ARITHMETIC MASKS

CROSS-REFERENCE TO RELATED APPLICATION

This application claims the benefit of Korean Patent Application No. 10-2009-0021866, filed Mar. 13, 2009, the subject matter of which is hereby incorporated by reference.

BACKGROUND

The inventive concept relates to a circuit and method for converting Boolean and arithmetic masks. More particularly, the inventive concept relates to a circuit and method for converting Boolean and arithmetic masks that reduce the overall number of logic gates and operate with greater speed.

A side-channel crypto-analysis approach, such as a differential power attack (DPA), can more efficiently obtain key information from a crypto system, as compared with conventional mathematical attacks. A masking method is one of the strongest methods of solving the DPA and conventionally uses Boolean and arithmetic masks.

The Boolean mask is a sequence pair (y, r) satisfying the relationship k=y^r with respect to an m-bit integer k, where "^" denotes an exclusive OR operation. The arithmetic mask is a sequence pair (x, r) satisfying the relationship k=x+r mod $2^n$ with respect to the m-bit integer k.

A circuit may be used for converting the Boolean and arithmetic masks during a cryptographic process, but such circuits use many logic gates and are characterized by slow operating speeds.

SUMMARY

Embodiments of the inventive concept provide a circuit for converting Boolean and arithmetic masks including a reduced number of logic gates and having a faster operating speed. Embodiments of the inventive concept also provide a method for converting Boolean and arithmetic masks using this type of circuit.

According to an aspect of the inventive concept, there is provided a circuit of converting Boolean and arithmetic masks comprising m converting units (m is an integer greater than or equal to 2), wherein the m converting unit includes: a first converting unit receiving first bits of each of a plurality of pieces of input data, outputting any one of the received first bits as a first output bit, performing an XOR operation with respect to a part of the received first bits, and outputting an XOR operation result as a first intermediate result bit to a second converting unit; and an nth converting unit (n is an integer greater than or equal to 2 and smaller than or equal to m) receiving n−1$^{th}$ bits and n$^{th}$ bits of each of the plurality of pieces of input data, and at least one of n−1$^{th}$ intermediate result bit and n−1$^{th}$ output bit from an n−1$^{th}$ converting unit, performing an AND operation and the XOR operation with respect to a first group of the received bits, outputting an operation result of the first group as an n$^{th}$ output bit, performing the AND operation and the XOR operation with respect to a second group of the received bits, and outputting an operation result of the second group as an n$^{th}$ intermediate result bit.

The nth converting unit may include: an AND performing circuit receiving at least one of the n−1$^{th}$ intermediate result bit and the n−1$^{th}$ output bit and the n−1$^{th}$ bits of each of the plurality of pieces of input data, performing the AND operation with respect to at least one of the n−1$^{th}$ intermediate result bit and the n−1$^{th}$ output bit and a part of the received n−1$^{th}$ bits, outputting a first AND result bit, performing the AND operation with respect to the at least one of the n−1$^{th}$ intermediate result bit and the n−1$^{th}$ output bit and another part of the received n−1$^{th}$ bits, and outputting a second AND result bit; and an XOR performing circuit receiving the n$^{th}$ bits and the n−1$^{th}$ bits of each of the plurality of pieces of input data, and the first and second AND result bits, performing the XOR operation with respect to a part of the received bits, outputting the n$^{th}$ intermediate result bit, performing the XOR operation with respect to another part of the received bits, and outputting the n$^{th}$ output bit.

The plurality of pieces of input data may include first through third input masks each having m bits (m is an integer greater than or equal to 2).

The XOR performing circuit may include: a first XOR operation performing unit receiving n$^{th}$ and n−1$^{th}$ bits of the second input mask, an n$^{th}$ bit of the third input mask, and the first and second AND result bits, performing the XOR operation with respect to the received bits, and outputting the n$^{th}$ intermediate result bit; and a second XOR operation performing unit receiving an n$^{th}$ bit of the first input mask, the n$^{th}$ bit of the second input mask, an n$^{th}$ bit of the third input mask, and the n$^{th}$ intermediate result bit, performing the XOR operation with respect to the received bits, and outputting the n$^{th}$ output bit.

The AND performing circuit may include: a first AND gate receiving the n−1$^{th}$ intermediate result bit of the n−1$^{th}$ converting unit and an n−1$^{th}$ bit of the first input mask, performing the AND operation with respect to the received bits, and outputting the first AND result bit; and a second AND gate receiving the n−1$^{th}$ bit of the first input mask and an n−1$^{th}$ bit of the third input mask, performing the AND operation with respect to the received bits, and outputting the second AND result bit.

The AND performing circuit may include: the first AND gate receiving the n−1$^{th}$ intermediate result bit and an n−1$^{th}$ output bit of the n−1$^{th}$ converting unit, performing the AND operation with respect to the received bits, and outputting the first AND result bit; and the second AND gate receiving the n−1$^{th}$ output bit of the n−1$^{th}$ converting unit and the n−1$^{th}$ bit of the third input mask, performing the AND operation with respect to the received bits, and outputting the second AND result bit.

The first and second AND result bits may be inverted and output.

The XOR performing circuit may include: a first XOR gate receiving and performing the XOR operation with respect to the n$^{th}$ bit of the second input mask and the n$^{th}$ bit of the third input mask, and outputting an operation result; a second XOR gate receiving and performing the XOR operation with respect to the n$^{th}$ bit of the first input mask and an output of the first XOR gate, and outputting an operation result; a third XOR gate receiving and performing the XOR operation with respect to the output of the first XOR gate and the n−1$^{th}$ bit of the second input mask, and outputting an operation result; a fourth XOR gate receiving and performing the XOR operation with respect to an output of the third XOR gate and the second AND result bit, and outputting an operation result; a fifth XOR gate receiving and performing the XOR operation with respect to an output of the fourth XOR gate and the first AND result bit, and outputting the n$^{th}$ intermediate result bit; and a sixth XOR gate receiving and performing the XOR operation with respect to an output of the second XOR gate and an output of the fifth XOR gate, and outputting the n$^{th}$ output bit.

The first converting unit may include: an XOR gate receiving and performing the XOR operation with respect to a first bit of the second input mask and a first bit of the third input mask, and outputting the first intermediate result, wherein the first converting unit outputs the first bit of the first input mask as the first output bit.

According to another aspect of the inventive concept, there is provided a method of converting Boolean and arithmetic masks, the method includes: receiving first through third input masks each having m bits (m is an integer greater than or equal to 2); performing an XOR operation with respect to a first bit of the second input mask and a first bit of the third input mask and outputting a first intermediate result bit; outputting a first bit of the first input mask as a first output bit; receiving an $n-1^{th}$ intermediate result bit (n is an integer greater than or equal to 2 and smaller than or equal to m), $n-1^{th}$ output bit and $n-1^{th}$ bits of each of the first and third input masks, performing an AND operation with respect to a part of the received $n-1^{th}$ intermediate result bit, $n-1^{th}$ output bit and the $n-1^{th}$ bits of each of the first and third input masks, and outputting first and second AND result bits; and receiving $n^{th}$ bits and the $n-1^{th}$ bits of each of the first through third input masks, and the first and second AND result bits, performing the XOR operation with respect to a part of the received $n^{th}$ bits and the $n-1^{th}$ bits of each of the first through third input masks and the first and second AND result bits, and outputting an $n^{th}$ intermediate result bit and an $n^{th}$ output bit.

BRIEF DESCRIPTION OF THE DRAWINGS

Embodiments of the inventive concept will be more clearly understood from the following detailed description, taken in conjunction with the accompanying drawings in which.

DETAILED DESCRIPTION OF EMBODIMENTS

Certain embodiments of the inventive concept will now be described with reference to the accompanying drawings. It should be noted, however, that the inventive concept may be variously embodied and should not be construed as being limited to only the illustrated embodiments. Throughout the written description and drawings, like reference number and labels are used to denote like or similar elements.

Figure 1:
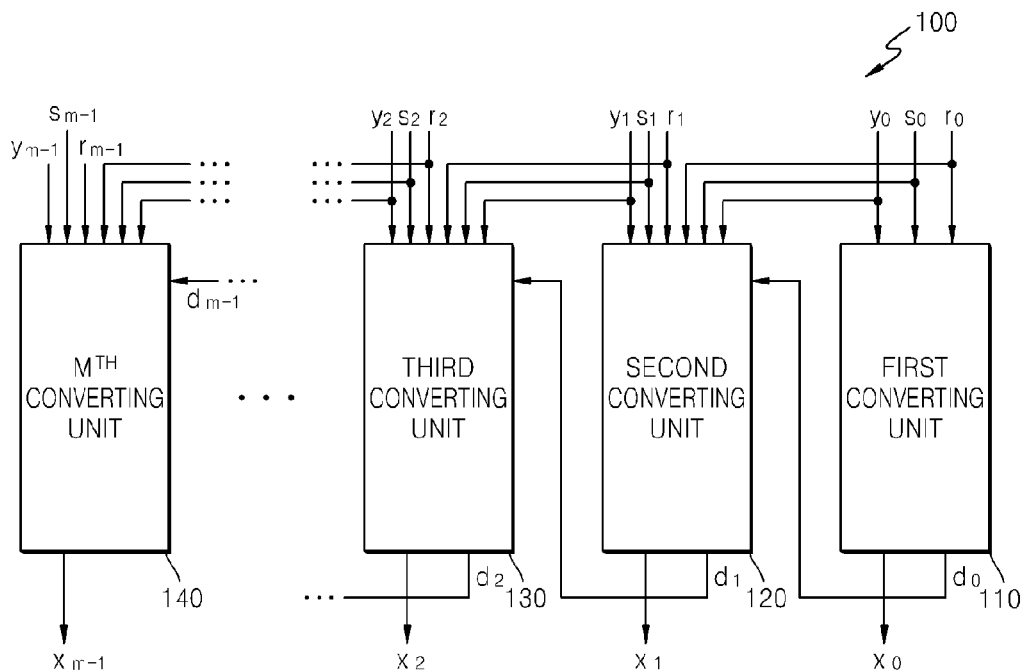
FIG. 1 is a block circuit diagram of a circuit for converting Boolean and arithmetic masks according to an embodiment of the inventive concept.

FIG. 1 is a block circuit diagram of a circuit 100 for converting Boolean and arithmetic masks according to an embodiment of the inventive concept. Referring to FIG. 1, the circuit 100 comprises "m" converting units, where m is an integer greater than 1. The m converting units in the illustrated embodiment include a first converting unit 110, a second converting unit 120, a third converting unit 130, etc., up to an $m^{th}$ converting unit 140.

Each of the first converting unit 110, the second converting unit 120, the third converting unit 130, and the $m^{th}$ converting unit 140 receives input data, e.g., input data y, s, and r. For example, the input data may include a first input mask y, a second input mask r, and a third input mask s, each having m bits. Input data $y_0$ denotes a first (or least significant LSB) bit of the first input mask y. Input data $y_1$ denotes a second bit of the first input mask y. And input data $y_{m-1}$ denotes an $m^{th}$ (or most significant MSB) bit of the first input mask y. Input data $r_0, r_1, r_{m-1}$, and $s_0, s_1, s_{m-1}$ similarly denote respective bits of the second input mask r and the third input mask s. Those skilled in the art will recognize that the foregoing examples of input data are merely illustrative and the inventive concept is not limited to only these examples.

When the first input mask y and the second input mask r are Boolean masks of an integer k having m bits, the circuit 100 of converting the Boolean and arithmetic masks may obtain arithmetic masks x, r of the integer k having m bits. That is, if the first input mask y and the second mask r are input into the m converting units 110, 120, 130 and 140, each of the m converting units 110, 120, 130 and 140 will output m output bits $x_{n-1}, x_2, x_1$, and $x_0$. The value x of a sequence pair of an arithmetic mask of the integer k having m bits may be obtained by combining the m output bits $x_{n-1}, x_2, x_1$, and $x_0$. As a result, the x and the second input mask r are the sequence pair of an arithmetic mask of the integer k having m bits. In this regard, the third input mask is input data used to perform an operation of the circuit 100 of converting the Boolean and arithmetic masks, and may be a random number generated by a general random number generator.

Meanwhile, when an $n-1^{th}$ output bit of an $n-1^{th}$ converting unit is input into an $n^{th}$ converting unit, instead of an $n-1^{th}$ bit of the first input mask y, the circuit 100 for converting the Boolean and arithmetic masks may convert the arithmetic mask into the Boolean mask. That is, if the circuit 100 for converting the Boolean and arithmetic masks is changed, like the second output bit $x_1$ of the second converting unit 120 is input into the third converting unit 130, instead of the second bit $y_1$ of the first input mask y, it may be possible to convert the arithmetic mask into the Boolean mask. This will be in some additional detail with reference to FIG. 7.

The first converting unit 110 receives the first bits $y_0, r_0$, and $s_0$ of each of the input data y, r, and s, and outputs any one of the received first bits $y_0, r_0$, and $s_0$ as a first output bit $x_0$. The first converting unit 110 performs an exclusive OR (XOR) operation with respect to at least part of the received first bits $y_0, r_0$, and $s_0$ and outputs a first intermediate result bit $d_0$ to the second converting unit 120.

The second converting unit 120 receives the first bits $y_0, r_0$, and $s_0$ and the second bits $y_1, r_1$, and $s_1$ of each of the input data y, r, and s, and receives the first intermediate result bit $d_0$ from the first converting unit 110. The second converting unit 120 receives the first output bit $x_0$ from the first converting unit 110. The second converting unit 120 performs AND and XOR operations with respect to a first group of the received first bits $y_0, r_0$, and $s_0$ and the received second bits $y_1, r_1$, and $s_1$, outputs the operation result as a second output bit $x_1$, performs the AND and XOR operations with respect to a second group of the received first bits $y_0, r_0$, and $s_0$ and the received second bits $y_1, r_1$, and $s_1$, and outputs a second intermediate result bit $d_1$ to the third converting unit 130. The first and second groups may include at least parts of the received first bits $y_0, r_0$, and $s_0$ and the received second bits $y_1$, $r_1$, and $s_1$. The first and second groups may include different bits, respectively. This will be described in some additional detail with reference to FIGS. 2 and 3.

The third converting unit 130 and the $m^{th}$ converting unit 140 operate in a similar manner to the second converting unit 120 although the third converting unit 130 and the $m^{th}$ converting unit 140 are different from the second converting unit 120 in terms of input data. Thus, since the third converting unit 130 and the $m^{th}$ converting unit 140 are the same as described with reference to the second converting unit 120, the detailed descriptions thereof will not be repeated here.

Figure 2:
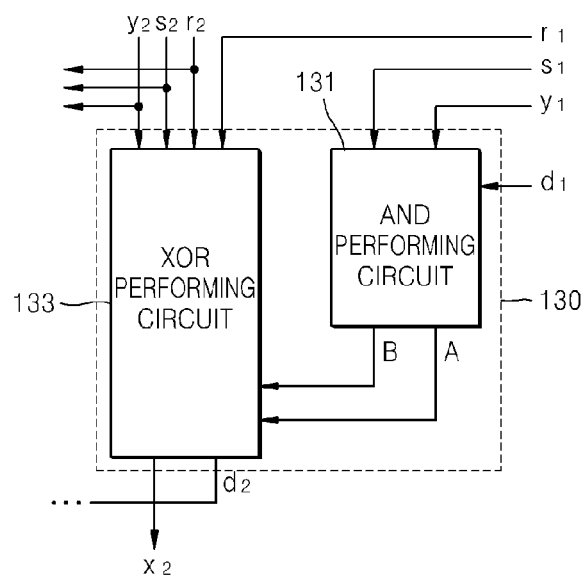
FIG. 2 is a block circuit diagram further illustrating the third converting unit of FIG. 1.

FIG. 2 is a block circuit diagram further illustrating the third converting unit 130 of FIG. 1. The second converting unit 120 and the $m^{th}$ converting unit 140 may have a similar structure to the third converting unit 130 shown in FIG. 2.

In the illustrated embodiment of FIG. 2, the third converting unit 130 comprises an AND performing circuit 131 and an XOR performing circuit 133. The AND performing circuit 131 receives the second intermediate result bit $d_1$ from the second converting unit 120, the second bit $y_1$ of the first input mask y, and the second bit $s_1$ of the third input mask s. Meanwhile, the AND performing circuit 131 receives the second output bit $x_1$ of the second converting unit 120, instead of the second bit $y_1$ of the first input mask y, according to another embodiment of the inventive concept.

The AND performing circuit 131 performs an AND operation with respect to at least part of the received second intermediate result bit $d_1$, the received second bit $y_1$ of the first input mask y, and the received second bit $s_1$ of the third input mask s, and output an operation result as a first AND result bit A. The AND performing circuit 131 performs the AND operation with respect to another part of the received second intermediate result bit $d_1$, the received second bit $y_1$ of the first input mask y, and the received second bit $s_1$ of the third input mask s, and output an operation result as a second AND result bit B. For example, the AND performing circuit 131 may perform the AND operation with respect to the received second intermediate result bit $d_1$ and the second bit $y_1$ of the first input mask y, and output an operation result as the first AND result bit A, perform the AND operation with respect to the second bit $y_1$ of the first input mask y and the second bit $s_1$ of the third input mask s, and output an operation result as the second AND result bit B. This will be described in some additional detail with reference to FIG. 4.

The XOR performing circuit 133 receives the third bit $y_2$ of the first input mask y, the third bit $r_2$ of the second input mask r, the third bit $s_2$ of the third input mask s, and the second bit $r_1$ of the second input mask r. The XOR performing circuit 133 further receives the first and second AND result bits A and B of the AND performing circuit 131.

The XOR performing circuit 133 performs an XOR operation with respect to at least part of the received bits $y_2$, $r_2$, $s_2$, $r_1$, A and B, outputs a third intermediate result bit $d_2$ to a fourth converting unit (not shown), performs the XOR operation with respect to another part of the received bits $y_2$, $r_2$, $s_2$, $r_1$, A and B, and outputs a third output bit $x_2$. For example, the XOR performing circuit 133 performs the XOR operation with respect to the third bit $r_2$ of the second input mask r, the third bit $s_2$ of the third input mask s, the second bit $r_1$ of the second input mask r, and the first and second AND result bits A and B, and outputs the third intermediate result bit $d_2$ to the fourth converting unit (not shown). Further, the XOR performing circuit 133 performs the XOR operation with respect to the third bit $y_2$ of the first input mask y, the second bit $r_1$ of the second input mask r, and the first and second AND result bits A and B, and outputs the third output bit $x_2$.

It will be appreciated by those skilled in the art that the third converting unit 130 may be configured with different hardware and yet accomplish the functionality described in relation to FIG. 2.

Figure 3:
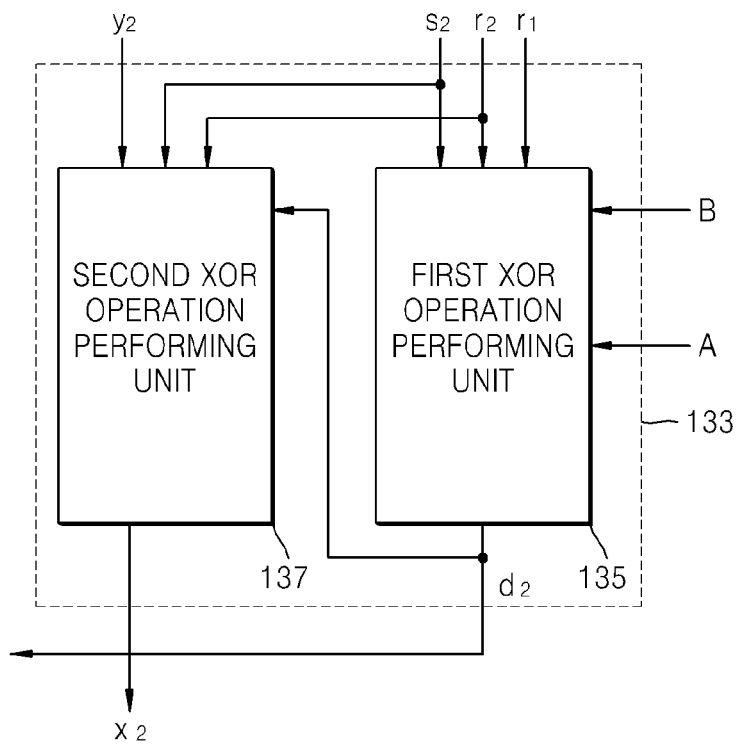
FIG. 3 is a block circuit diagram further illustrating the XOR performing circuit of FIG. 2 according to one embodiment of the inventive concept.

FIG. 3 is a block circuit diagram further illustrating the XOR performing circuit 133 of FIG. 2. An XOR performing circuit included in the second converting unit 120 and the $m^{th}$ converting unit 140 shown in FIG. 1 may have a similar structure to the XOR performing circuit 133 shown in FIG. 3.

Referring to FIG. 3, the XOR performing circuit 133 includes a first XOR operation performing unit 135 and a second XOR operation performing unit 137. The first XOR operation performing unit 135 performs an XOR operation with respect to the third bit $r_2$ of the second input mask r, the third bit $s_2$ of the third input mask s, the second bit $r_1$ of the second input mask r, and the first and second AND result bits A and B, and outputs the third intermediate result bit $d_2$. The first XOR operation performing unit 135 outputs the third intermediate result bit $d_2$ to the second XOR operation performing unit 137 and a fourth converting unit (not shown). Meanwhile, the second XOR operation performing unit 137 performs the XOR operation with respect to the third bit $y_2$ of the first input mask y, the third bit $r_2$ of the second input mask r, the third bit $s_2$ of the third input mask s, and the third intermediate result bit $d_2$, and outputs the third output bit $x_2$.

Figure 4:
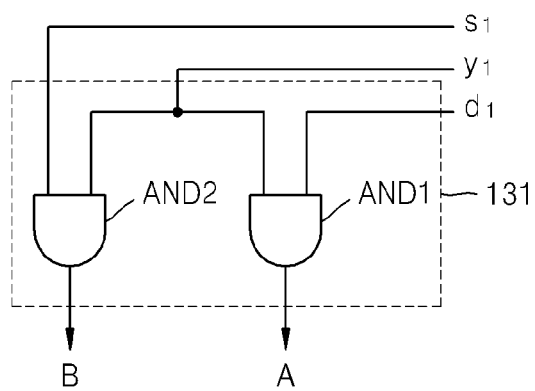
FIG. 4 is a circuit diagram further illustrating the AND performing circuit of FIG. 2.

FIG. 4 is a circuit diagram further illustrating the AND performing circuit 131 of FIG. 2. The illustrated example of AND performing circuit 131 includes a first AND gate AND1 and a second AND gate AND2. An AND performing circuit included in the second converting unit 120 and the $m^{th}$ converting unit 140 shown in FIG. 1 may have a similar structure to the AND performing circuit 131 shown in FIG. 4.

The first AND gate AND1 receives the second intermediate result bit $d_1$ of the second converting unit 120 and the second bit $y_1$ of the first input mask y, performs an AND operation with respect to the received bits $d_1$ and $y_1$, and outputs the first AND result bit A. The second AND gate AND2 receives the second bit $y_1$ of the first input mask y and the second bit $s_1$ of the third input mask s, performs the AND operation with respect to the received bits $s_1$ and $y_1$, and outputs the second AND result bit B.

Meanwhile, as described with reference to FIG. 1, the AND performing circuit 131 receives the second output bit $x_1$ of the second converting unit 120, instead of the second bit $y_1$ of the first input mask y, according to another embodiment of the inventive concept. That is, the first AND gate AND1 receives and performs the AND operation with respect to the second intermediate result bit $d_1$ and the second output bit $x_1$ of the second converting unit 120, and outputs the first AND result bit A. The second AND gate AND2 receives and performs the AND operation with respect to the second output bit $x_1$ of the second converting unit 120 and the second bit $s_1$ of the third input mask s, and outputs the second AND result bit B. As described above, the circuit 100 of converting the Boolean and arithmetic masks may convert the arithmetic mask into the Boolean mask according to another embodiment of the inventive concept.

Meanwhile, the AND performing circuit 131 inverts and outputs the first and second AND result bits A and B by connecting an inverter to output terminals of the first and second AND gates AND1 and AND2 as shown in FIG. 4. Although the AND performing circuit 131 may invert and output the first and second AND result bits A and B, the circuit 100 of converting the Boolean and arithmetic masks may output the same result.

Figure 5:
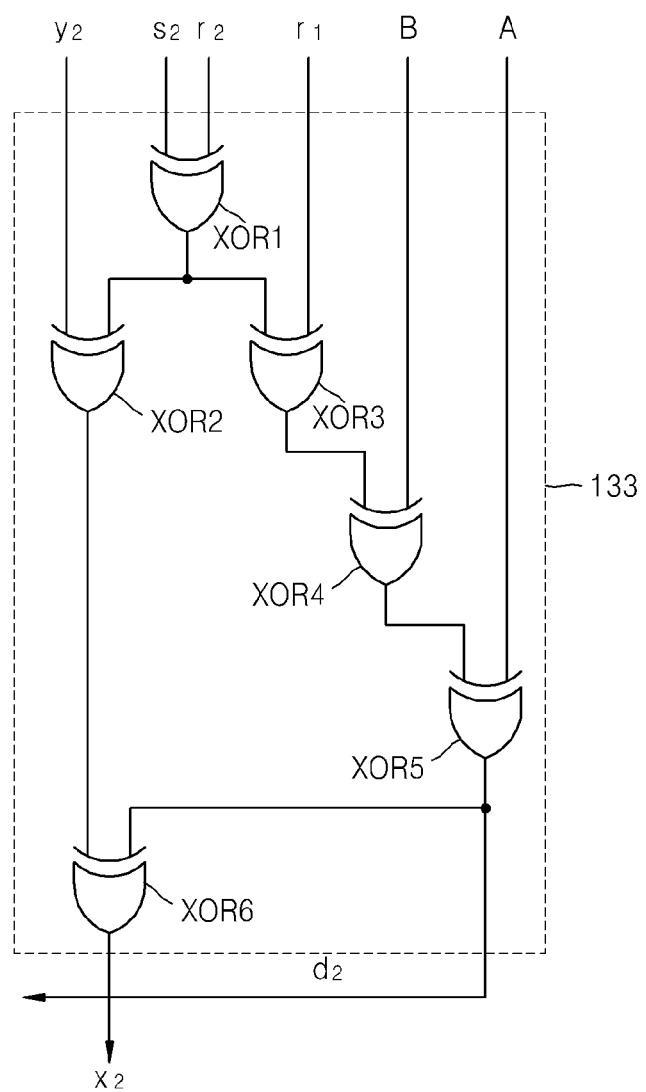
FIG. 5 is a circuit diagram further illustrating the XOR performing circuit of FIG. 2 according to another embodiment of the inventive concept.

FIG. 5 is a circuit diagram further illustrating the XOR performing circuit 133 of FIG. 2 according to another embodiment of the inventive concept. The XOR performing circuit included in the second converting unit 120 and the m$^{th}$ converting unit 140 shown in FIG. 1 may have a similar structure to the XOR performing circuit 133 shown in FIG. 5.

Referring to FIG. 5, the XOR performing circuit 133 includes first through sixth XOR gates XOR1 through XOR6.

The first XOR gate XOR1 receives and performs an XOR operation with respect to the third bit $r_2$ of the second input mask r and the third bit $s_2$ of the third input mask s, and outputs an operation result.

The second XOR gate XOR2 receives and performs the XOR operation with respect to the third bit $y_2$ of the first input mask y and an output of the first XOR gate XOR1, and outputs an operation result.

The third XOR gate XOR3 receives and performs the XOR operation with respect to the output of the first XOR gate XOR1 and the second bit $r_1$ of the second input mask r, and outputs an operation result.

The fourth XOR gate XOR4 receives and performs the XOR operation with respect to an output of the third XOR gate XOR3 and the second AND result bit B, and outputs an operation result.

The fifth XOR gate XOR5 receives and performs the XOR operation with respect to an output of the fourth XOR gate XOR4 and the first AND result bit A, and outputs an operation result as the third intermediate result bit $d_2$. The fifth XOR gate XOR5 may output the third intermediate result bit $d_2$ to the sixth XOR gate XOR6 and a fourth converting unit (not shown).

The sixth XOR gate XOR6 receives and performs the XOR operation with respect to an output of the second XOR gate XOR2 and the third intermediate result bit $d_2$, and outputs an operation result as the third output bit $x_2$.

Figure 6:
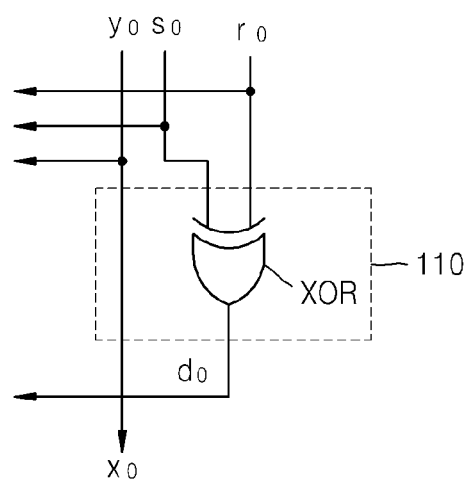
FIG. 6 is a circuit diagram further illustrating the first converting unit of FIG. 1.

FIG. 6 is a circuit diagram further illustrating the first converting unit 110 of FIG. 1. Referring to FIG. 6, the first converting unit 110 includes an XOR gate that receives and performs an XOR operation with respect to the first bit $r_0$ of the second input mask r and the first bit $s_0$ of the third input mask s, and outputs an operation result as the first intermediate result bit $d_0$. The first converting unit 110 outputs the first bit $y_0$ of the first input mask y as the first output bit $x_0$. The first converting unit 110 outputs the first intermediate result bit $d_0$ to the second converting unit 120.

The operation of the circuit 100 for converting the Boolean and arithmetic masks will now be described with reference to FIGS. 1 through 6.

When the first input mask y and the second input mask r are Boolean masks of an integer k having m bits, the circuit 100 obtains arithmetic masks x, r of the integer k having m bits. That is, if the first input mask y and the second mask r are input into the m converting units 110, 120, 130 and 140, each of the m converting units 110, 120, 130 and 140 outputs m output bits $x_{n-1}$, $x_2$, $x_1$, and $x_0$. The value x of a sequence pair of an arithmetic mask of the integer k having m bits may be obtained by combining the m output bits $x_{n-1}$, $x_2$, and $x_0$. As a result, the x and the second input mask r are the sequence pair of an arithmetic mask of the integer k having m bits. In this regard, the third input mask is input data used to perform an operation of the circuit 100 of converting the Boolean and arithmetic masks, and may be a random number generated by a general random number generator.

It is assumed that an $i^{th}$ carry bit $c_i$ (i is 0 or an integer greater than 0) is obtained by performing an XOR operation with respect to an $i^{th}$ intermediate result bit $d_i$, an $i^{th}$ bit $r_i$ of the second input mask r, and an $i^{th}$ bit $s_i$ of the third input mask s. That is, if $c_i = d_i \hat{} r_i \hat{} s_i$, $c_0 = d_0 \hat{} r_0 \hat{} s_0 = 0$ and $x_0 = y_0 = a_0 \hat{} r_0$ as shown in FIG. 6.

When i>0, the $i^{th}$ carry bit $c_i$ is expressed according to equation 1 below.

$$c_i = d_i \hat{} r_i \hat{} s_i$$
$$= s_i \hat{} r_i \hat{} r_{i-1} \hat{} (s_{i-1} y_{i-1}) \hat{} (y_{i-1} d_{i-1}) \hat{} r_i \hat{} s_i$$
$$(d_i = s_i \hat{} r_i \hat{} r_{i-1} \hat{} (s_{i-1} y_{i-1}) \hat{} (y_{i-1} d_{i-1}))$$
$$= r_{i-1} \hat{} (s_{i-1} y_{i-1}) \hat{} (y_{i-1} d_{i-1})$$
$$= r_{i-1} \hat{} (s_{i-1} \hat{} d_{i-1}) y_{i-1}$$
$$= r_{i-1} \hat{} (c_{i-1} \hat{} r_{i-1}) y_{i-1} \; (s_{i-1} \hat{} d_{i-1} = c_{i-1} \hat{} r_{i-1})$$
$$= r_{i-1} \hat{} (c_{i-1} \hat{} r_{i-1})(a_{r-1} \hat{} r_{r-1}) \; (y_{i-1} = a_{r-1} \hat{} r_{r-1})$$
$$= (c_{i-1} \hat{} a_{i-1}) \hat{} (c_{i-1} \hat{} r_{i-1}) \hat{} (r_{r-1} a_{r-1})$$

Meanwhile, when i>0, referring to FIG. 5, an $i^{th}$ output bit $x_i$ is expressed according to equation 2 below.

$$x_i = y_i \hat{} s_i \hat{} r_i \hat{} d_i$$
$$= y_i \hat{} c_i \; (c_i = d_i \hat{} r_i \hat{} s_i)$$
$$= a_i \hat{} r_i \hat{} c_i \; (y_i = a_i \hat{} r_i)$$

Therefore, $x_i = a_i \hat{} r_i \hat{} c_i$ and $c_i = c_{i-1} a_{r-1} \hat{} c_{i-1} r_{i-1} \hat{} r_{i-1} a_{r-1}$ based on the results of equations 1 and 2. The relation expressions are the same as input and output relation expressions of a ripple adder that is well known to one of ordinary skill in the art and thus it is satisfied that $x = x_{n-1} \ldots x_0$ is $x = a + r \bmod 2^n$. Therefore, the circuit 100 for converting the Boolean and arithmetic masks may obtain the arithmetic mask x, r when the Boolean mask y, r of the integer k having m bits is given.

Figure 7:
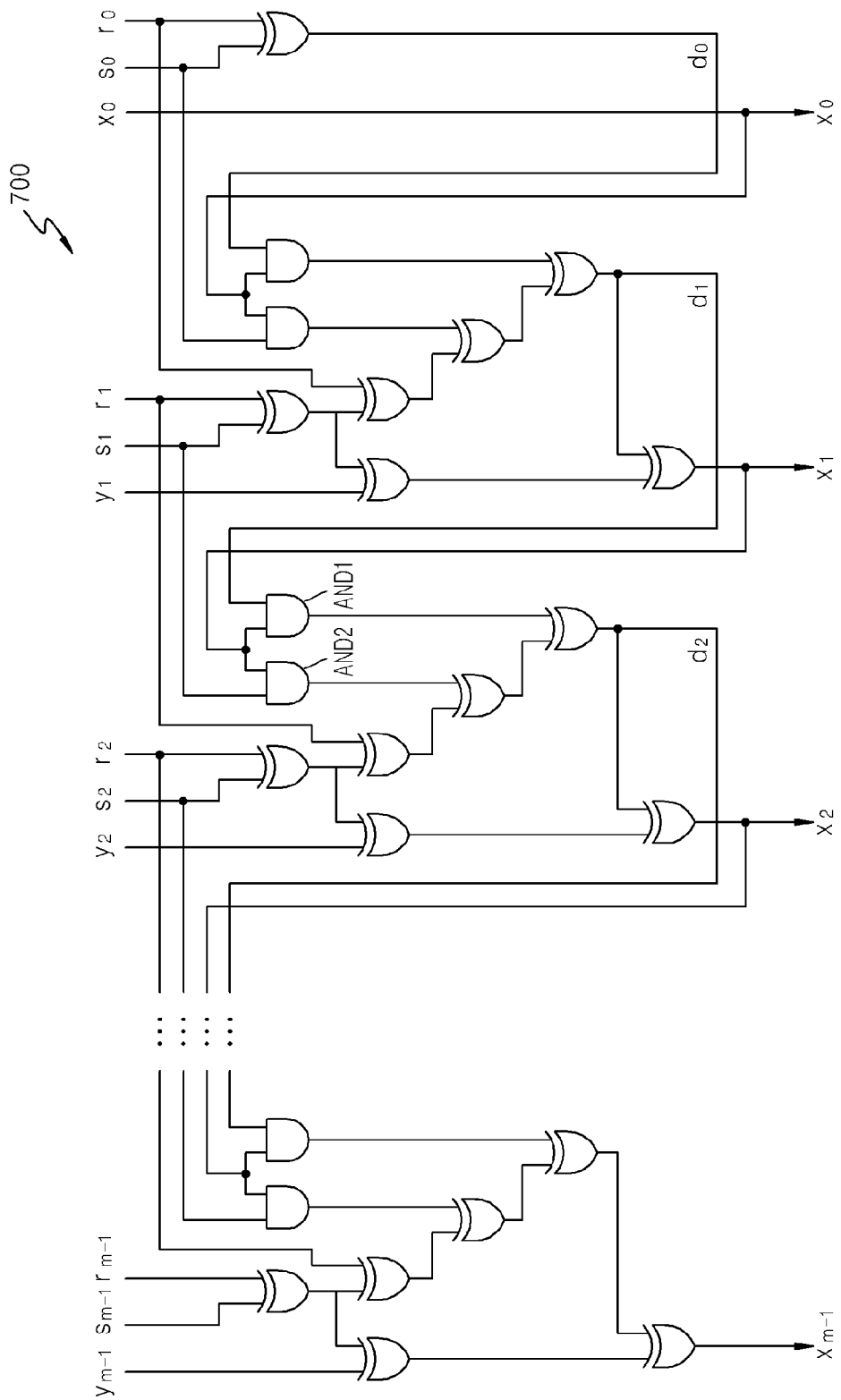
FIG. 7 is a diagram of a circuit for converting Boolean and arithmetic masks according to another embodiment of the inventive concept.

FIG. 7 is a diagram of a circuit 700 configured to convert Boolean and arithmetic masks according to another embodiment of the inventive concept. Referring to FIG. 7, the circuit 700 is similar to circuit 100 described with reference to FIGS. 1 through 6. However, in the circuit 700, AND gates AND1 and AND2 receive n$^{th}$ output bits $x_{n-1}, \ldots, x_2, x_1, x_0$), instead of first input masks $y_{n-1}, \ldots, y_2, y_1, y_0$.

As described with reference to FIG. 1, when an n$^{th}$ converting unit of the circuit 700 for converting Boolean and arithmetic masks receives an n−1$^{th}$ output bit of an n−1$^{th}$ converting unit, instead of an n−1$^{th}$ bit of a first input mask y, the circuit 700 for converting Boolean and arithmetic masks may convert the arithmetic mask into the Boolean mask. Referring to the equations 1 and 2, the operation of converting the arithmetic mask into the Boolean mask is obvious to one of ordinary skill in the art and thus the detailed description thereof will not be repeated here.

Figure 8:
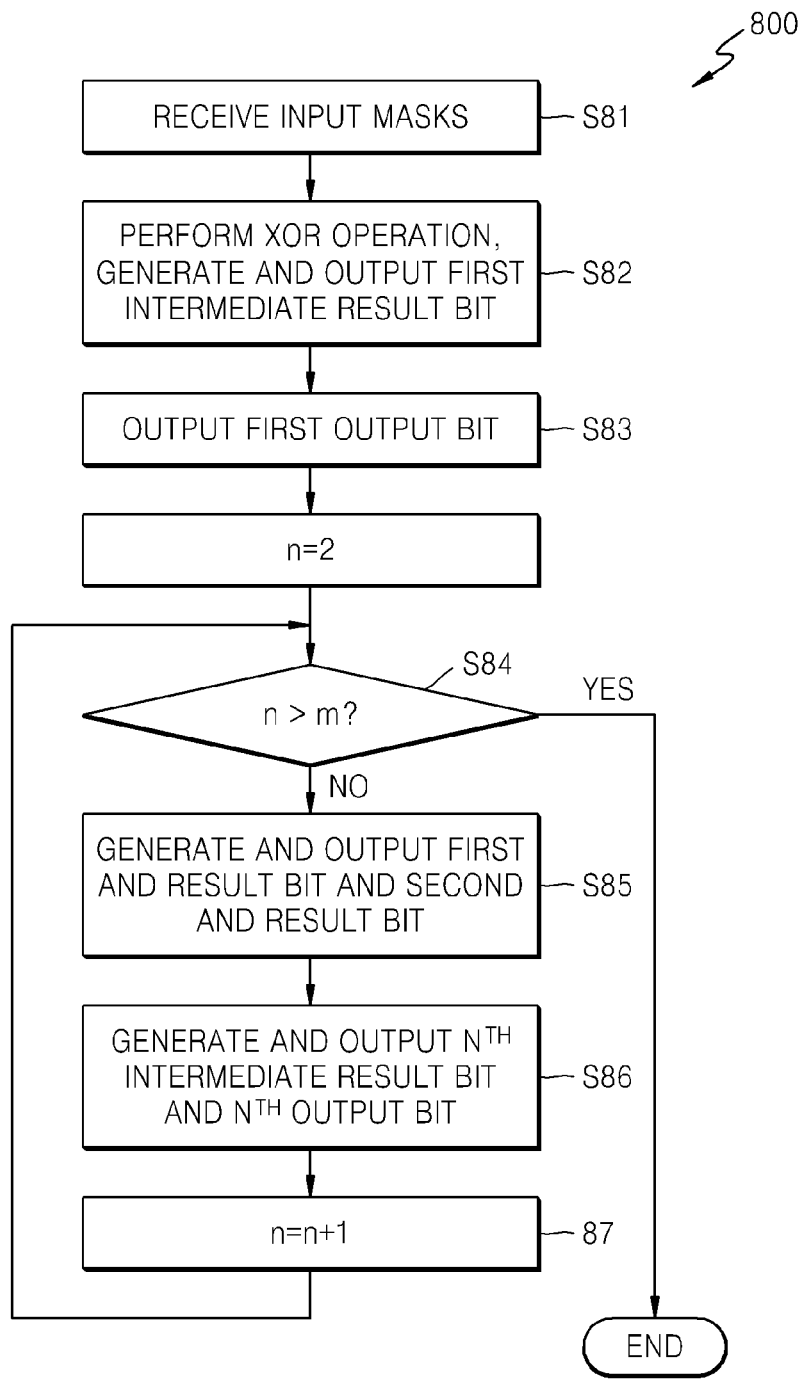
FIG. 8 is a flowchart summarizing a method for converting Boolean and arithmetic masks according to an embodiment of the inventive concept.

FIG. 8 is a flowchart summarizing a method 800 for converting Boolean and arithmetic masks according to an embodiment of the inventive concept. Referring to FIG. 8, the method 800 for converting Boolean and arithmetic masks includes receiving first through third input masks each having m bits, where m is an integer greater than 1 (S81), receiving and performing an XOR operation with respect to a first bit of the second input mask and a first bit of the third input mask and outputting a first intermediate result bit (S82), and outputting a first bit of the first input mask as a first output bit (S83).

The method 800 for converting Boolean and arithmetic masks may further include receiving an n−1$^{th}$ intermediate result bit, where n is an integer greater than 1 and less than or equal to m, and n−1$^{th}$ bits of each of the first through third input masks, performing an AND operation with respect to a part of the received n−1$^{th}$ intermediate result bit and a part of the n−1$^{th}$ bits of each of the first through third input masks, and outputting first and second AND result bits (S85), receiving n$^{th}$ bits and the n−1$^{th}$ bits of each of the first through third input masks, and the first and second AND result bits, performing the XOR operation with respect to a part of the received n$^{th}$ bits and the n−1$^{th}$ bits of each of the first through third input masks and the first and second AND result bits, and outputting an n$^{th}$ intermediate result bit and an n$^{th}$ output bit (S86), and comparing n and m (S84), and, if n is greater than m, ending the operation.

The method 800 for converting Boolean and arithmetic masks is described with reference to FIGS. 1 through 7 and thus the detailed description thereof will not be repeated here.

While the inventive concept has been particularly shown and described with reference to embodiments thereof, it will be understood that various changes in form and details may be made therein without departing from the scope of the following claims.

What is claimed is:

1. A circuit for converting Boolean and arithmetic masks comprising m converting units, wherein m is an integer greater than 1 and each one of the m converting unit comprises:
   a first converting unit configured to receive first bits of input data, output one of the first bits as a first output bit, perform an XOR operation with respect to at least part of the first bits, and output an XOR operation result as a first intermediate result bit to a next converting unit in a sequence of converting unit ranging between 2 and n−1$^{th}$; and
   an n$^{th}$ converting unit, wherein n is an integer greater than or equal to 2 and less than or equal to m, configured to receive n−1$^{th}$ bits and n$^{th}$ bits of the input data, and at least one of an n−1$^{th}$ intermediate result bit and n−1$^{th}$ output bit from an n−1$^{th}$ converting unit, perform an AND operation and the XOR operation with respect to a first group of the received bits, output an operation result for the first group as an n$^{th}$ output bit, perform the AND operation and the XOR operation with respect to a second group of the received bits, and output an operation result of the second group as an n$^{th}$ intermediate result bit.

2. The circuit of claim 1, wherein the n$^{th}$ converting unit comprises:
   an AND performing circuit configured to receive at least one of the n−1$^{th}$ intermediate result bit and the n−1$^{th}$ output bit and the n−1$^{th}$ bits of each of the input data, perform the AND operation with respect to at least one of the n−1$^{th}$ intermediate result bit and the n−1$^{th}$ output bit and a first part of the received n−1$^{th}$ bits, output a first AND result bit, perform the AND operation with respect to the at least one of the n−1$^{th}$ intermediate result bit and the n−1$^{th}$ output bit and a second part of the received n−1$^{th}$ bits, and output a second AND result bit; and
   an XOR performing circuit configured to receive the n$^{th}$ bits and the n−1$^{th}$ bits of the input data and the first and second AND result bits, perform the XOR operation with respect to a first part of the received bits, output the n$^{th}$ intermediate result bit, perform the XOR operation with respect to a second part of the received bits, and output the n$^{th}$ output bit.

3. The circuit of claim 2, wherein the input data comprises first through third input masks each having m bits, where m is an integer greater than 1.

4. The circuit of claim 3, wherein the XOR performing circuit comprises:
   a first XOR operation performing unit configured to receive n$^{th}$ and n−1$^{th}$ bits of the second input mask, an n$^{th}$ bit of the third input mask, and the first and second AND result bits, perform the XOR operation with respect to the received bits, and output the n$^{th}$ intermediate result bit; and
   a second XOR operation performing unit configured to receive an n$^{th}$ bit of the first input mask, the n$^{th}$ bit of the second input mask, an n$^{th}$ bit of the third input mask, and the n$^{th}$ intermediate result bit, perform the XOR operation with respect to the received bits, and output the n$^{th}$ output bit.

5. The circuit of claim 4, wherein the AND performing circuit comprises:
   a first AND gate configured to receive the n−1$^{th}$ intermediate result bit of the n−1$^{th}$ converting unit and an n−1$^{th}$ bit of the first input mask, perform the AND operation with respect to the received bits, and output the first AND result bit; and
   a second AND gate configured to receive the n−1$^{th}$ bit of the first input mask and an n−1$^{th}$ bit of the third input mask, perform the AND operation with respect to the received bits, and output the second AND result bit.

6. The circuit of claim 4, wherein the AND performing circuit comprises:
   the first AND gate configured to receive the n−1$^{th}$ intermediate result bit and an n−1$^{th}$ output bit of the n−1$^{th}$ converting unit, perform the AND operation with respect to the received bits, and output the first AND result bit; and
   the second AND gate configured to receive the n−1$^{th}$ output bit of the n−1$^{th}$ converting unit and the n−1$^{th}$ bit of the third input mask, perform the AND operation with respect to the received bits, and output the second AND result bit.

7. The circuit of claim 5, wherein the first and second AND result bits are inverted as output.

8. The circuit of claim 3, wherein the XOR performing circuit comprises:
   a first XOR gate configured to perform the XOR operation with respect to the n$^{th}$ bit of the second input mask and the n$^{th}$ bit of the third input mask, and output an operation result;
   a second XOR gate configured to perform the XOR operation with respect to the n$^{th}$ bit of the first input mask and an output of the first XOR gate, and output an operation result;
   a third XOR gate configured to perform the XOR operation with respect to an output of the first XOR gate and the n−1$^{th}$ bit of the second input mask, and output an operation result;
   a fourth XOR gate configured to perform the XOR operation with respect to an output of the third XOR gate and the second AND result bit, and output an operation result;
   a fifth XOR gate configured to perform the XOR operation with respect to an output of the fourth XOR gate and the first AND result bit, and output the n$^{th}$ intermediate result bit; and
   a sixth XOR gate configured to perform the XOR operation with respect to an output of the second XOR gate and an output of the fifth XOR gate, and output the n$^{th}$ output bit.

9. The circuit of claim 1, wherein the first converting unit comprises:

an XOR gate configured to perform the XOR operation with respect to a first bit of the second input mask and a first bit of the third input mask, and output the first intermediate result, wherein the first converting unit outputs the first bit of the first input mask as the first output bit.

10. A method of converting Boolean and arithmetic masks, the method comprising:

receiving first through third input masks each having m bits, where m is an integer greater than 1;

applying a first bit of the second input mask and a first bit of the third input mask as inputs to a XOR circuit of a first converting unit, and outputting a first intermediate result bit from the XOR circuit of the first converting unit;

outputting a first bit of the first input mask as a first output bit;

receiving an $n-1^{th}$ intermediate result bit, where n is an integer greater than or equal to 2 and less than or equal to m, an $n-1^{th}$ output bit and $n-1^{th}$ bits of each of the first and third input masks, applying at least part of the received $n-1^{th}$ intermediate result bit, $n-1^{th}$ output bit and the $n-1^{th}$ bits of each of the first and third input masks as inputs to an AND circuit of an $n^{th}$ converting unit, and outputting first and second AND result bits from the AND circuit of the $n^{th}$ converting unit; and receiving $n^{th}$ bits and the $n-1^{th}$ bits of each of the first through third input masks, and the first and second AND result bits, applying at least part of the received $n^{th}$ bits and the $n-1^{th}$ bits of each of the first through third input masks and the first and second AND result bits as inputs to a XOR circuit of the $n^{th}$ converting unit, and outputting an $n^{th}$ intermediate result bit and an $n^{th}$ output bit from the XOR circuit of the $n^{th}$ converting unit.

* * * * *